United States Patent
Nagajjanavar

(10) Patent No.: US 8,194,188 B2
(45) Date of Patent: Jun. 5, 2012

(54) DISPLAYING IMAGE FRAMES IN COMBINATION WITH A SUBPICTURE FRAME

(75) Inventor: Tarakeshwar Chikkanna Nagajjanavar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 632 days.

(21) Appl. No.: 12/416,948

(22) Filed: Apr. 2, 2009

(65) Prior Publication Data

US 2010/0253848 A1    Oct. 7, 2010

(51) Int. Cl.
 H04N 9/74    (2006.01)
 H04N 9/76    (2006.01)
(52) U.S. Cl. ........................ 348/584; 348/598
(58) Field of Classification Search .................. 348/584, 348/588, 598, 599, 586, 563–565, 567; H04N 9/74, H04N 9/76, 5/445, 5/45
See application file for complete search history.

(56) References Cited

U.S. PATENT DOCUMENTS 6,144,415 A * 11/2000 Patton et al. .................. 348/565
6,864,921 B2 * 3/2005 Kaneda et al. ................ 348/588

* cited by examiner

*Primary Examiner* — Sherrie Hsia
(74) *Attorney, Agent, or Firm* — Robert D. Marshall, Jr.; Wade James Brady, III; Frederick J. Telecky, Jr.

(57) ABSTRACT

An aspect of the present invention reduces memory accesses while forming combined images of a subpicture frame with each of a sequence of image frames. In an embodiment, line information indicating the specific lines (e.g., rows) of the subpicture frame having display information is first generated. The line information is then used to retrieve only those lines of the subpicture frame that have display information while forming combined frames. According to another aspect, the portions of the combined images having sharp edges due to the inclusion of the subpicture frame are identified based on the line information, and such portions are then filtered. The sequence of combined frames may be displayed on a video output device.

12 Claims, 6 Drawing Sheets

DISPLAYING IMAGE FRAMES IN COMBINATION WITH A SUBPICTURE FRAME

BACKGROUND

1. Technical Disclosure

The present disclosure relates generally to image processing, and more specifically to displaying image frames in combination with a subpicture frame.

2. Related Art

An image frame generally contains a set of pixel values, with each pixel value defining the display of a corresponding image portion (pixel) on a display screen. A subpicture frame is also an image frame, but having display information in a smaller size area. The subpicture frame can represent content such as a desired text, icons, etc., as is well known in the relevant arts.

There is often a need to display image frames in combination with a subpicture frame. For example, it may be desirable to display a menu along with a sequence of image frames received in a video signal, to facilitate a user to select a desired option on the menu. The menu may be represented in the form of a subpicture frame and combined with each of the sequence of image frames, in facilitating such a selection.

It is generally desirable that such combined images be generated, while meeting requirements specific to corresponding environments.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An aspect of the present invention reduces resource requirements when forming combined images based on a subpicture frame and a sequence of image frames by generating line information indicating the specific lines of the subpicture frame which contain display information.

In an embodiment, memory accesses are reduced while forming combined images of a subpicture frame with each of a sequence of image frames. The line information is used to retrieve only those lines of the subpicture frame that have display information while forming combined frames of each of the sequence of image frames with the subpicture frame. As unneeded lines of the subpicture frame may not be retrieved, memory accesses are reduced.

Another embodiment reduces filtering requirements by using the line information. In particular, the portions of the combined images having sharp edges due to the inclusion of the subpicture frame are identified based on the line information, and such portions are then filtered. Unneeded filtering of other portions of the combined frames may thus be avoided to reduce filtering requirement, for example, for the interlace television displays such as NTSC, PAL.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

BRIEF DESCRIPTION OF THE VIEWS OF DRAWINGS

Aspects of the present invention will be described with reference to the following accompanying drawings, which are described briefly below.

FIG. 6 is a schematic diagram illustrating the combining of an image frame with a subpicture frame in an embodiment of the present invention with an example.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

Various embodiments are described below with several examples for illustration.

1. Example Environment

Figure 1:
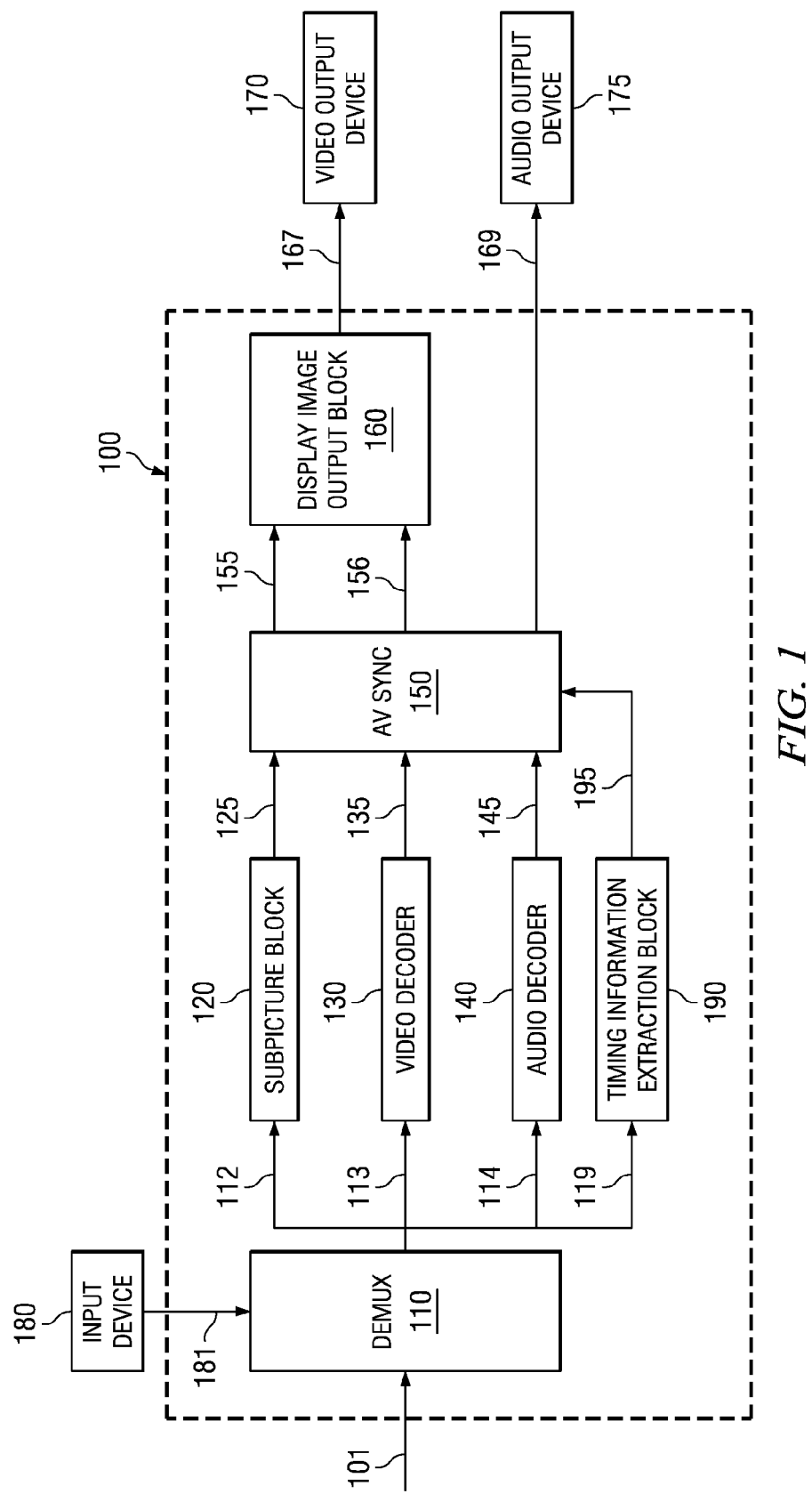
FIG. 1 is a block diagram illustrating the details of an example environment in which several aspects of the present invention may be implemented.

FIG. 1 is a block diagram illustrating the details of an example environment in which several aspects of the present invention may be implemented. The environment is shown containing video output device 170, audio output device 175, input device 180 and multimedia device 100. Only representative devices/blocks are shown for illustration. One skilled in the relevant arts will however appreciate that the features can be implemented in various other environments by reading the present disclosure.

Several features of the invention are described with respect to multimedia device 100, which reproduces the content of ("plays") various multimedia components (audio, video, etc.) present in multimedia signal 101. Multimedia signal 101 contains subpicture frames, which are combined with the image frames in a video component, according to several aspects of the present invention. It may be appreciated that a subpicture frame is specified for several (e.g., few hundreds) successive image frames in the multimedia signal, and accordingly it may be desirable that the combining operation be performed with reduced processing resources.

The multimedia signal may be in formats such as DivX®, DVD, etc., well known in the relevant arts and accordingly multimedia device 100 is referred to as a DivX player or a DVD player respectively when playing the corresponding signals. It may be appreciated that the multimedia signals in such a case may contain subpictures representing sub-titles in different languages, represented as corresponding subpicture frames. Typically a user selects at most one of the languages, and the subpicture frame representing the information in the selected language is combined (typically overlaid on top of) with the image frames of the video component.

Video output device 170 displays the (combined) image frames provided by multimedia device 100. Video output device 170 may be, for example, a television or a computer monitor screen. Audio output device 175 plays the audio output provided by multimedia device 100. Audio output device 175 may be, for example, a loudspeaker or an earphone.

Input device 180 enables a user to provide various input signals, which control the content and display of subpictures (in addition to potentially facilitating control of images corresponding to the image frames). For an understanding of the embodiments with respect to playing the content of Divx/DVD format signals, it is sufficient that the input signals select one of the languages and the subpicture frame of the corresponding language (menu) is provided for combining with the image frames of the video signal. However, in alternative embodiments, input device 180 can have additional features which causes subpicture frames with more complex content to be formed. The signals generated by the input device are sent on path 181 to multimedia device 100.

Multimedia device 100 is shown containing demux (demultiplexer) 110, subpicture block 120, video decoder 130, audio decoder 140, timing info (information) extraction block 190 and display image output block 160. Each of these blocks are described below in detail.

Demux 110 separates encoded subpicture, video and audio frames (three multimedia components) and timestamp information from an input multimedia stream/signal 101, which may be received over a network or a storage medium. The separated subpicture frames are sent to subpicture block 120 on path 112. Also, the subpicture frames of different languages may be received on path 101, and only the frames corresponding to the selected language are provided on path 112. The separated timestamp information is sent to timing info extraction block 190 on path 119. The separated video and audio frames are sent to the corresponding decoders on paths 113 and 114 respectively.

Audio decoder 140 converts encoded audio frames received on path 114 to a form suitable for use in audio output device 175. The audio frames received on path 114 are encoded according to approaches specified by a media format used, such as DivX or DVD. A corresponding decoding approach is carried out at audio decoder 140 (as well as other decoders).

In one approach, audio decoder 140 first obtains parameters of the encoded audio frames (for example, sampling frequency) necessary for decoding the encoded frames. Quantized audio data is then extracted from the encoded audio frames using the obtained parameters. Inverse quantization is carried out on these data to get sampled audio data. One or more filters process these data to generate audio signals corresponding to the encoded frames. The audio signals ("audio content") are sent to AV-Sync block 150 to be synchronized with data decoded by subpicture block 120 and video decoder 130.

Video decoder 130 decodes the video frames received on path 113 to generate a sequence of video/image frames that can be displayed on video output device 170. The decoding operation involves inverse operations of the encoding operation, such as inverse coding, inverse quantization and inverse transformation, well known to one skilled in the relevant arts.

Each decoded frame thus formed contains a set of pixel values, with each value representing the image of a corresponding image portion. The decoded video/image frames are sent to AV-Sync block 150 to be synchronized with the outputs of audio decoder 140 and subpicture block 120.

Subpicture block 120 forms subpicture frames which are later combined with image frames according to various aspects of the present invention. In an embodiment, the subpicture frames of a language selected by a user (signals received on path 112) is selected as the subpicture frames to be combined with the image frames in the video component.

However, alternative approaches can be used in other environments, in which subpicture frames are formed using other approaches. The subpicture frames may be represented with the same dimensions as the image frames provided on path 135. This frame (as a bit map) may be stored in a storage medium (which may correspond to a Random Access Memory (RAM), for example, and not shown in FIG. 1) for subsequent use. It may also be sent to AV-Sync block 150 on path 125 along with timing information extracted from the timing info extraction block 190 to synchronize the various multimedia component content.

Timing info extraction block 190 extracts timing information parameters from the timestamp information received on path 119. The extracted timing information parameters determine the order of playback for the audio, video and subpicture components in the multimedia stream. The parameters are sent to AV Sync 150 for synchronizing the audio, video and subpicture frames.

AV-Sync block 150 synchronizes the time of playback of audio, image and subpicture components. This is needed to ensure that every image frame is displayed with a corresponding subpicture frame, and the corresponding audio data is played when the image and subpicture are displayed. Synchronization is performed using the timing information parameters provided by timing info extraction block 190 on path 195, along with a reference timing information (such as a system clock in multimedia device 100, for example, in a known way). The synchronized image and subpicture frames are sent to display image output block 160.

Display image output block 160 forms the image frames to be displayed on video output device 170 by combining each of a sequence of video frames (path 135) with a subpicture frame (path 125). Combining implies that the image corresponding to the subpicture would be represented along with the image corresponding to the video frame, in the combined image. It should be appreciated that the subpicture frame can change after being combined with some video/image frames, and accordingly the changed subpicture frame is thereafter used for the combining operation.

In an embodiment, the combining operation includes determining the pixel values of the subpicture frame pixels, and deciding whether to combine a subpicture pixel with a corresponding image pixel or not based on the determined value. The approach in such an embodiment is described in detail below.

Display image output block 160 may perform other operations, as suitable/desirable in specific situations. In an embodiment, such operations include anti-flicker filtering, which generally entails smoothening the very thin horizontal lines/edges to avoid flicker in the displayed images. The manner in which such an operation is performed according to an aspect of the present invention, is described below in further detail.

The subpicture frame is represented with the same dimensions (number of rows and columns) as the image frame on path 135. As the subpicture frame typically has an image occupying a smaller area (compared to the image corresponding to the image frame on path 135), the subpicture frame contains several pixel values (e.g., equaling 0) indicating that there is no image representation at the corresponding location/image portion. The pixel values at each location of the subpicture frame can either be absolute values or alternatively a lookup mechanism can be employed, as described below.

In case of a lookup mechanism, determining the values of a subpicture frame pixels entails referring to a table, referred to as a Color Look Up Table (CLUT). The CLUT maps a set of numbers (the values of bits used to represent each pixel, often called index numbers) to another set of numbers representing the pixel values for a particular color format such as RGB, YCbCr or YUV, for the corresponding pixel. For example, if multimedia device 100 follows the DivX format, 2 bits are used for representing each subpicture frame pixel. If the bits representing a particular pixel are 10 (binary), then their value (equaling 2, the 'index value') is used to refer to the CLUT and obtain the YUV pixel values for the corresponding subpicture pixel.

The pixel values determine whether the subpicture frame pixels are to be combined with the video frame pixels. If the pixel value is zero, then the combined image frame pixel has the corresponding image frame pixel value (background pixel value, assuming that the subpicture frame is being 'superimposed' on the image frame treated as a background). For non-zero subpicture frame pixel values, the combining approach depends on a standard specified by the media format used. For example, in the DVD format, combining entails a weighted combination of the video frame pixel values and the corresponding subpicture frame pixel values. In the case of DivX format, combining involves substitution/replacement of the decoded subpicture frame pixel value in place of the background pixel value (for the same position).

The approach used in general for combining image frames with subpicture frames in several aspects of the present invention is described below with respect to a flowchart.

2. Forming Combine Image Frames Using Subpicture Frames

Figure 2:
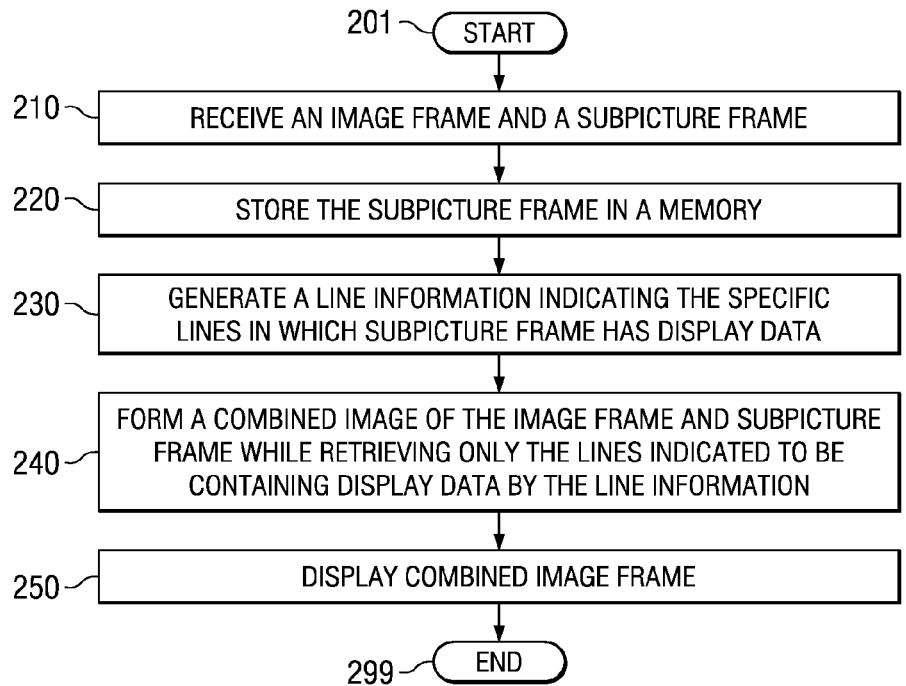
FIG. 2 is a flowchart illustrating the manner in which each of a sequence of image frames is combined with a subpicture frame in a multimedia device.

FIG. 2 is a flowchart illustrating the manner in which each of a sequence of image frames is combined with a subpicture frame in a multimedia device. The flowchart is described with respect to FIG. 1 merely for illustration. However, various features described herein can be implemented in other environments, as will be apparent to one skilled in the relevant arts by reading the disclosure provided herein. The flowchart begins in step 201 and control passes to step 210.

In step 210, multimedia device 100 receives an image frame and a subpicture frame. The image frame is decoded by an image decoder or video decoder (if the image is part of a video sequence).

In step 220, subpicture block 120 decodes the subpicture frame and stores it in a memory. The memory includes hardware storage elements, into which data can be stored and retrieved. Each pixel of the decoded subpicture frame is represented by a set of bits, whose number is decided by the media format used, such as DivX or DVD media formats.

In step 230, subpicture block 120 generates line information indicating the specific lines of the subpicture frame having display data. That is, the line information indicates whether each of the lines (row/column) contains at least one pixel position with image content. The line information may be stored in a memory, which may be retrieved by any block in multimedia device 100 which processes subpicture frames, such as display image output block 160.

In one embodiment, line information is a one dimensional array of integers and each integer corresponding to one row. A zero value in the $i^{th}$ position indicates that the all the pixels in a corresponding $i^{th}$ row do not contain any image content (that is, subpicture frame pixels of the corresponding line are not required in the combined frame for that row). On the other hand, a non-zero value in the $i^{th}$ position indicates that a corresponding $i^{th}$ line of the subpicture frame contains image content, which has to be combined with the corresponding pixels in a video frame.

In step 240, display image output block 160 forms a combined image of the image frame and the subpicture frame while retrieving only those lines of the subpicture frame indicated to be containing display information by the line information.

It may be further appreciated that the formation of combined image may entail multiple operations. In an embodiment, the formation entails combining the subpicture frame with each of the image frames, and then performing anti-flicker filtering (by appropriate processing of the digital values). Irrespective, when the subpicture frame is used for any operations, the line information can be used to determine the specific areas whether display information is present, and retrieve only the required pixel values of the subpicture frame.

It may be appreciated that retrieving only those lines of the subpicture frame which contain display information from the memory, reduces the number of memory accesses (to subpicture frame) and thus makes the combining operation faster.

In step 250, video output device 170 displays the combined image frame generated in step 240. The flowchart ends in step 299.

The approach described in FIG. 2 may be implemented in the example environment of FIG. 1 in different embodiments. One such embodiment is described below.

3. Example Embodiment with Optimal Retrievals

Figure 3:
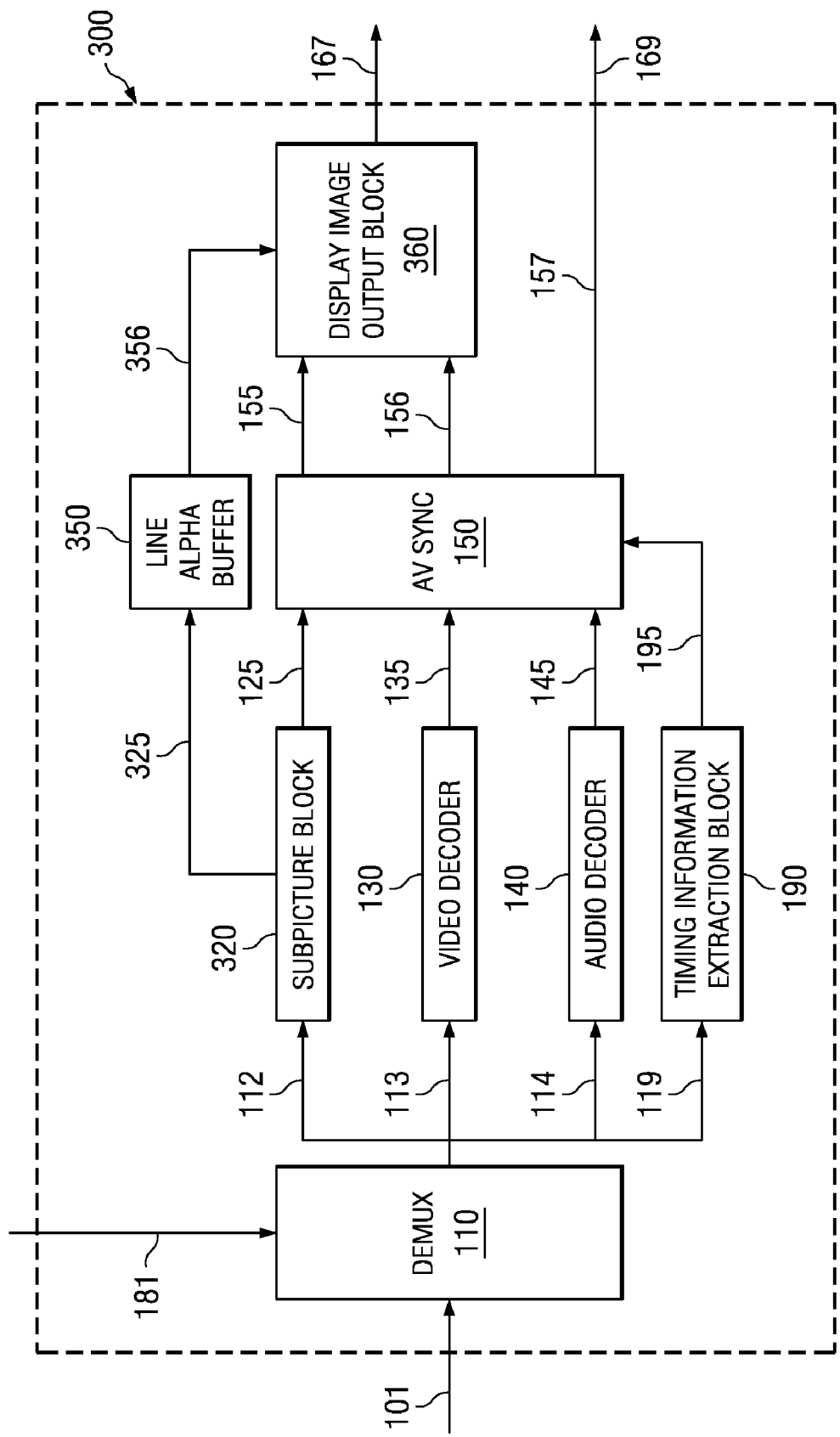
FIG. 3 is a block diagram illustrating an example embodiment in which several aspects of the present invention may be implemented.

FIG. 3 is a block diagram illustrating an example embodiment in which several aspects of the present invention may be implemented. Device 300 corresponds to a multimedia device. Components shown in multimedia device 100 and retained in device 300 are shown with the same numbering as shown in FIG. 1 and the description is not repeated for conciseness. Newly introduced components subpicture block 320, display image output block 360 and line alpha buffer 350 are described below.

Subpicture block 320 is shown providing two outputs—decoded subpicture frame (similar to in FIG. 1) on path 125 and line information on path 325. The line information may be stored in a memory referred to as line alpha buffer 350. The decoded subpicture frame is sent to AV Sync block 150 for synchronizing the video and audio frames with the subpicture. The decoded subpicture is also stored in a storage medium (as described with respect to multimedia device 100, not shown in FIG. 3) for later use.

The line information stored in line alpha buffer 350 is used by display image output block 360 for forming the combined frame for display. Various operations may be performed in forming such a combined frame. In an embodiment, as noted above with respect to step 240 of FIG. 2, forming the combined image entails two operations—(1) combining each image frame with the subpicture frame; and (2) anti-flicker filtering. Both of these operations may use the line information as described in sections below in further detail.

Display image output block 360 is shown receiving the line information on path 356. The line information (as well as the size of the subpicture frame) need to be consistent with the dimensions of the image frames provided by video decoder 130. In case, video decoder 130 provides resized image frames, the line information may also need to correspond to such resizing. Similarly, when the subpicture frame is to be resized independently (i.e., to be superimposed on the image frames of the same size before and after resizing), the line information may need to again correspond to such resized subpicture.

Details of forming the line information in an example embodiment are provided below.

4. Forming Line Information

Figure 4:
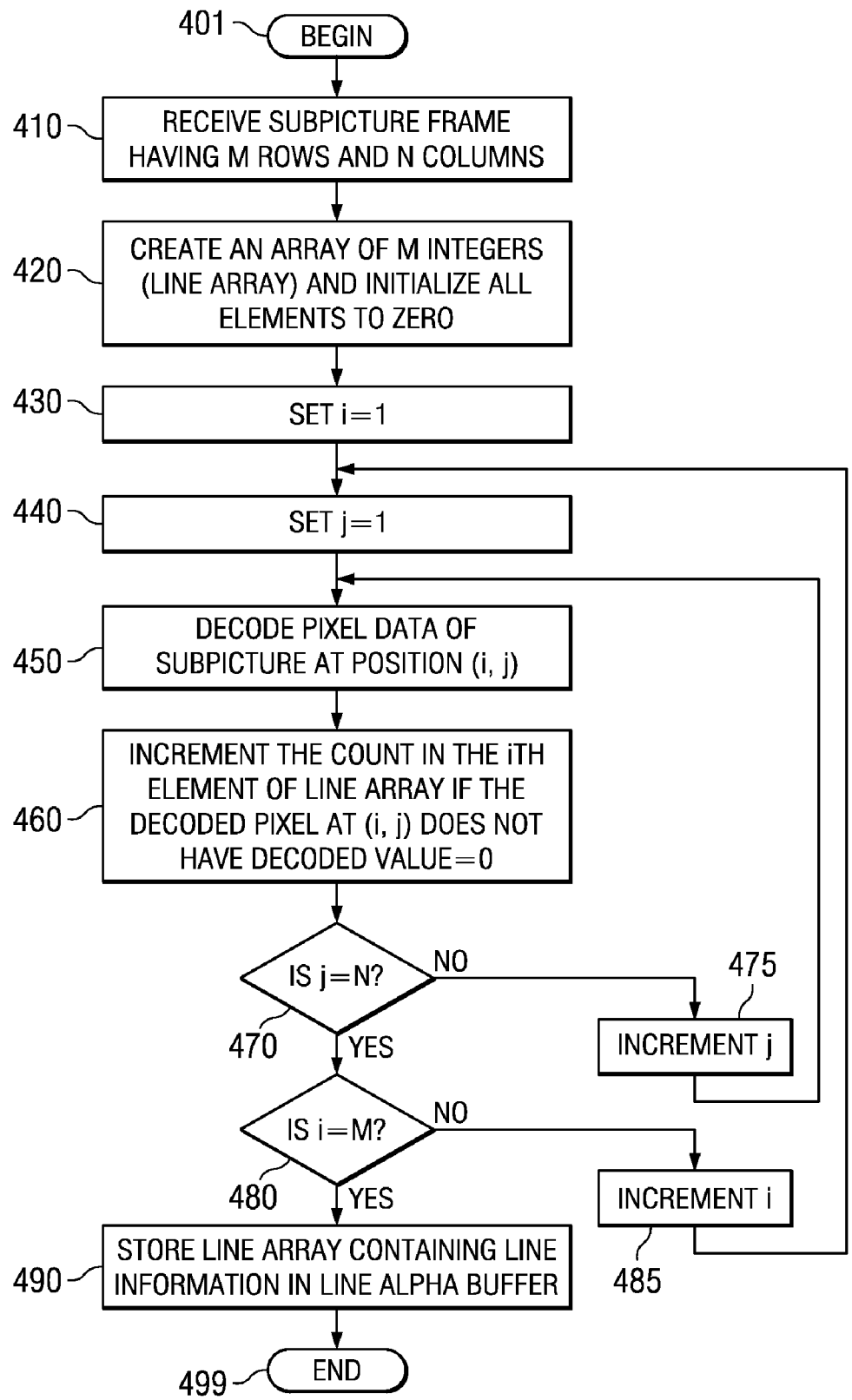
FIG. 4 is a flowchart depicting the manner in which line information is formed in an embodiment of the present invention.

FIG. 4 is a flowchart depicting the manner in which line information is formed in an embodiment of the present invention. The flowchart begins in step 401 and control passes to step 410.

In step 410, subpicture block 320 receives a subpicture frame having M rows and N columns (same dimension as the image frames on path 135). In step 420, subpicture block 320 creates an array of M integers referred to as line array. Each of the integers is initialized to zero.

In step 430, subpicture block 320 initializes a counter variable i to 1. The variable i is used to index the rows in the subpicture frame, and hence i will take values between 1 and M, inclusive. In step 440, subpicture block 320 initializes a counter variable j to 1. The variable j is used to index the columns in the subpicture frame, and hence j will take values between 1 and N, inclusive.

In step 450, subpicture block 320 decodes the pixel at the $i^{th}$ row and $j^{th}$ column of the subpicture frame.

In step 460, subpicture block 320 increments the count in the $i^{th}$ position in the line array if the pixel at the $i^{th}$ row and $j^{th}$ column does not have a decoded value of 0. A value of 0 for the decoded value indicates that there is no display information at the corresponding position of the subpicture frame and thus pixel at $i^{th}$ column and $j^{th}$ row of the subpicture frame need not be combined with the corresponding pixel in the video frame. If the decoded value is non-zero, then the integer at position i in the line array is incremented, indicating that the $i^{th}$ row of the subpicture frame contains display information which has to be combined with the corresponding video frame pixel.

In step 470, subpicture block 320 checks if all columns of the $i^{th}$ row have been processed. If they are not, then it increments variable j in step 475, and repeats steps 450 and 460.

In step 480, subpicture block 320 checks if all rows of the subpicture frame have been processed. If not, then it increments variable i in step 485, and repeats the steps from 440 to 475.

In step 490, subpicture block 320 stores the line array containing line information in line alpha buffer 350 (which may be an external storage medium). At this point, all the pixels of the subpicture frame have been processed.

It may be appreciated that when the line array is stored in line alpha buffer in step 490, each entry of the array indicates the number of (gives a count of) pixels in the corresponding row having display information. For example, if row 6 of the subpicture frame has 8 pixels with display information, the sixth element of the line array would equal 8. The flowchart ends in step 499.

While the above described approach relies on examining a decoded subpicture frame to form line information, it should be appreciated that alternative approaches can be employed to form the same information. For example, the encoded information received on path 112 may be in the form of a run length encoded (RLE) form, and thus the run lengths of value 0 (no display information) and non-zero (having display information) may be used to determine the specific positions of line array, which have to also be set to 0 and to non-zero values respectively. For example, if decoded information indicates that the first (Y*N) values are 0, the first Y entries of the line array may be set to 0.

The line array stored in memory is used by display image output block 360 to combine subpicture frames with image frames as described below with an example.

5. Combining Image Frames and Subpicture Frames in an Embodiment

Figure 5:
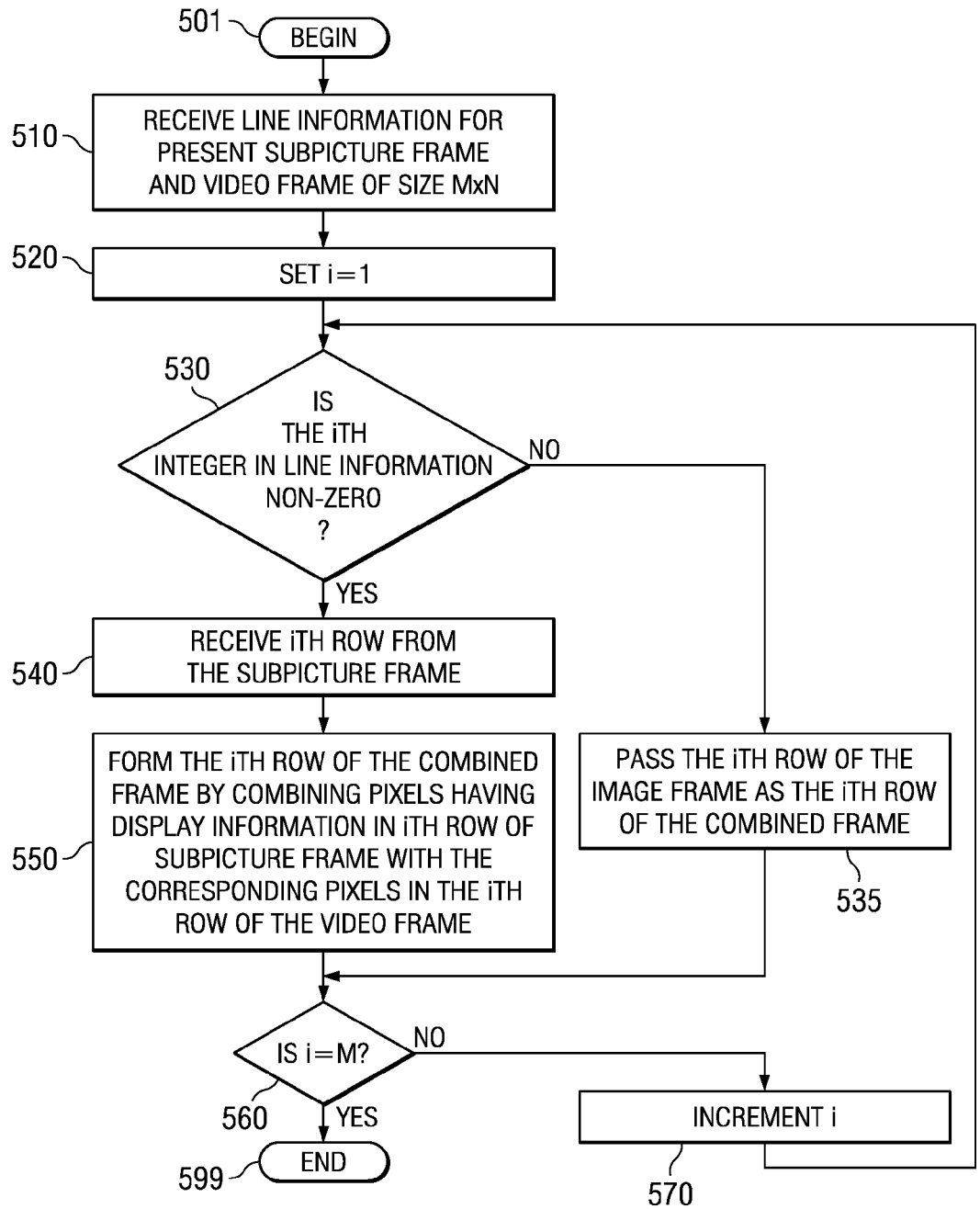
FIG. 5 is a flowchart illustrating the manner in which an image frame is combined with a subpicture frame in an embodiment of the present invention.

FIG. 5 is a flowchart illustrating the manner in which an image frame is combined with a subpicture frame in an embodiment of the present invention. The flowchart is described with respect to FIG. 3 merely for illustration. However, various features described herein can be implemented in other environments, as will be apparent to one skilled in the relevant arts by reading the disclosure provided herein. The flowchart begins in step 501 and control passes to step 510.

In step 510, display image output block 360 receives the line array containing line information for the current subpicture frame on path 356 and the video frame to be combined on path 156. If the subpicture frame is of size M×N, then the line array contains M elements. It is assumed here that the size of the image frame and the subpicture frame both equal M×N.

In step 520, display image output block 360 sets the counter variable i to 1. Counter variable varies from 1 to M as described below.

In step 530, display image output block 360 checks if the $i^{th}$ integer in the line array is 0. If the value is 0, then the subpicture frame does not have display information in the corresponding row and the row does not have to be combined with the corresponding row of the video frame. Accordingly, in step 535, the $i^{th}$ row of the image frame is passed as the $i^{th}$ row of the combined frame. Control then passes to step 560.

If the value is non-zero in step 530, it implies that the subpicture frame has display information in that row and at least one pixel in the subpicture frame has to be combined with a corresponding pixel in the image frame. In this case, control passes to step 540. In step 540, display image output block 360 retrieves the $i^{th}$ row of the subpicture frame from a memory (as described with respect to FIG. 3).

In step 550, display image output block 360 checks every pixel in the $i^{th}$ row of the subpicture frame to determine whether the pixel has display information or not. If the pixel has display information, then display image output block 360 combines the pixel with the corresponding pixel in the $i^{th}$ row of the image frame. The combined row thus formed is passed as the $i^{th}$ row of the combined frame.

In step 560, display image output block 360 checks if all the rows of the line array have been checked. If not, it increments variable i in step 570 and control passes to step 530. If all rows have been checked, it implies that all the rows of the subpicture have been combined with the image frame and the flowchart ends in step 599. The effect of operation of the flowcharts of FIGS. 4 and 5 is demonstrated below with an example.

6. Combining with an Example

FIG. 6A depicts an image frame having pixels represented with a subscript of I, and FIG. 6B depicts the corresponding subpicture frame that has to be combined with the image frame. The shaded pixels $S_{12}$, $S_{13}$, and $S_{22}$ represent subpicture pixels having display information, and the remaining pixel positions do not have display information.

FIG. 6C depicts the line array containing line information corresponding to the subpicture frame of FIG. 6B. Since only rows 1 and 2 of the subpicture frame have display information in them, the first and second elements of the line array have non-zero values in them, while the rest of the elements have a zero value in them. The first element of line array has value 2, indicating that 2 pixels in the first row of the corresponding subpicture frame have display information. Similarly, the second element of the line array has value 1 indicating that one pixel of the second row of the corresponding subpicture frame has display information.

FIG. 6D depicts the combined image frame, where the pixels $C_{12}$, $C_{13}$, and $C_{21}$ are pixels which have been obtained by combining the subpicture frame with the image frame, whereas all other pixels in the frame show background data—pixels of the image frame itself (with a subscript of I).

It may be readily observed that each of the image frames represents images containing physical objects. Generating the combined frames represents transformation of the data contained in the image frames and subpicture frames.

While the description above is provided with respect to combining, it should be appreciated that the line information can be used for other operations as well, as described below with an example.

7. Anti-Flicker Filtering

As is well known in the relevant arts, flicker is observed when images have sharp edges and it is accordingly desirable that the corresponding portions be smoothened. It may be appreciated that such sharp edges could be presented at the boundaries of the display information of the subpicture frame when included in the combined image. For example, sharp edges would be present at the boundary of $S_{11}$-$S_{12}$, $S_{21}$-$S_{22}$, $S_{23}$-$S_{13}$ and $S_{13}$-$S_{14}$ in the combined image representation of FIG. 6B.

It may accordingly be desirable to process the combined images thus generated to smoothen the sharp edges in the vertical direction and very thin horizontal lines (usually made of 1 or 2 pixel height) of the frame portion containing the display information of subpicture frame. As may be appreciated, assuming that smoothening of only the sharp edges formed by the boundary of display information of the subpicture frame, it may be necessary to determine the rows containing such boundaries.

Therefore, according to an aspect of the present invention, the rows containing the boundaries (vertical and horizontal) may be determined by examining the line information. With respect to FIG. 6C, if an entry contains a non-zero value, the corresponding row is considered as an input to the anti-flicker filter. Similarly, as many desired rows above the row with the first non-zero value and below the last non-zero value may also be provided as an input to the filter.

The desired number (of rows) can be 0 to a small number (e.g., less than or equal to 2). Assuming such number equals 1, the third row/line ($S_{31}$, $S_{32}$, etc. of FIG. 6B) may also be sent as an input along with the first two rows (by virtue of non-zero values). The pixel values corresponding to the three rows may be processed to perform a anti-flicker filtering operation (which can be implemented using well known approaches).

Again, by using the line information in line alpha buffer 350, display image output block 360 may avoid unneeded filtering of portions of the combined images, which are unaffected by the combining operation described above.

It should be appreciated that the above-described features of multimedia device 100/300 may be implemented in a combination of one or more of hardware, executable modules, and firmware (though the below embodiment is described as being implemented in the form of executable module instructions). The description is continued with respect to an embodiment in which various features are operative by execution of corresponding executable modules.

8. Digital Processing System

Figure 7:
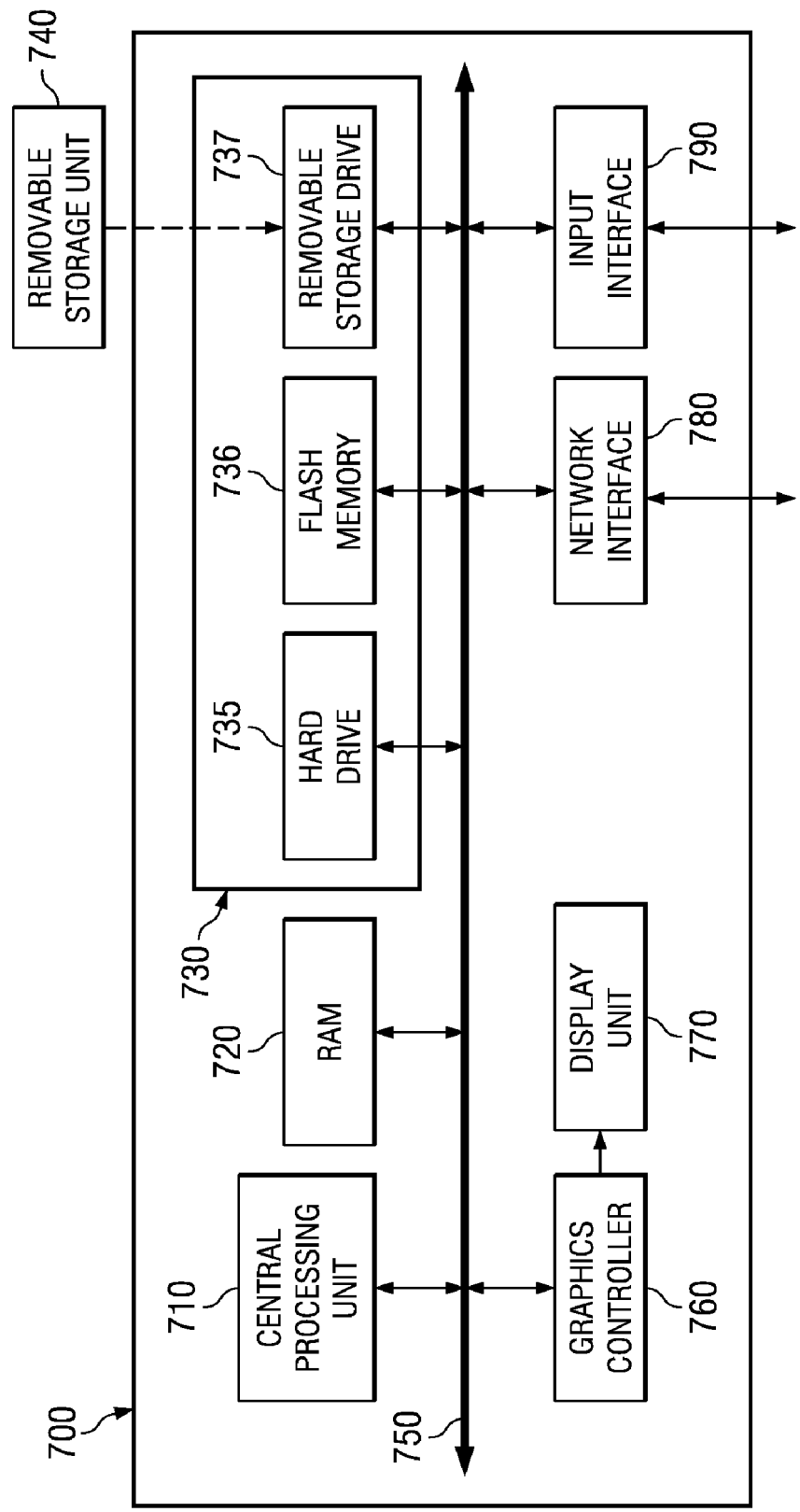
FIG. 7 is a block diagram illustrating the details of digital processing system 700 in which several aspects of the present invention are operative by execution of appropriate executable modules in one embodiment.

FIG. 7 is a block diagram illustrating the details of digital processing system 700 in which several aspects of the present invention are operative by execution of appropriate executable modules in one embodiment. Digital processing system 700 may correspond to multimedia decoding system 300 of FIG. 3.

System 700 may contain one or more processors a central processing unit (CPU) 710, RAM 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention (including processing subpictures and potentially causing transmission of the same via network interface 780). CPU 710 may contain multiple processing units, with each processing unit potentially being designed for a specific task. Alternatively, CPU 710 may contain only a single general purpose processing unit.

RAM 720 may receive instructions from secondary memory 730 using communication path 750. RAM 720 may also be used to store the decoded image/subpicture frames, line information (and thus providing space for the line alpha buffer), combined frames, etc., described above. Thus, CPU 710 may store/retrieve the corresponding data while executing the instructions, in providing several features of the invention described in sections above.

Graphics controller 760 generates display signals (e.g., in RGB format) to display unit 770 based on data/instructions received from CPU 710. Display unit 770 contains a display screen to display the combined images described above. Alternatively, display unit 770 may be contained in video output device 170.

Input interface 790 may correspond to a keyboard and a pointing device (e.g., touch-pad, mouse). Network interface 780 provides connectivity to a network (e.g., using Internet Protocol), and may be used to receive encoded frames from an encoding system (not shown). The network interface may also be used to send the combined frames on a network. Alternatively, the combined frames may be stored on removable storage driver 737 for later use.

Secondary memory 730 may contain hard drive 735, flash memory 736 and removable storage drive 737. Secondary memory 730 may store the data (e.g., multimedia signal and/or combined frames, etc.) and executable modules, which enable system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 937. Removable storage unit 740 may be implemented using medium and storage format compatible with removable storage drive 737 such that removable storage drive 737 can read the data and instructions. Thus, removable storage unit 740 includes a computer readable (storage) medium having stored therein computer executable modules and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing executable modules to digital processing system 700. CPU 710 may retrieve the executable module instructions, and execute the instructions to provide various features of the present invention described above.

9. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting the scope of the present invention in any way.

What is claimed is:

1. A method of generating images in a system, said method comprising:
    receiving a sequence of image frames and a subpicture frame;
    storing said subpicture frame in a memory;
    generating a line information indicating the specific lines of said subpicture frame having display information; and
    forming a sequence of combined images by combining each of said sequence of image frames with said subpicture frame while retrieving from said memory only the lines indicated to be containing display information by said line information.

2. The method of claim 1, wherein said subpicture frame and said sequence of image frames are contained in a same multimedia signal, and wherein said system comprises a multimedia device which reproduces the content of said multimedia signal.

3. The method of claim 2, wherein said line information indicates whether each row of said subpicture frame contains display information or not, wherein the rows indicated not to have said display information are not retrieved by said forming.

4. The method of claim 3, wherein said line information is represented in the form of an array of a single dimension, wherein each entry of said array indicates whether the corresponding row of said subpicture frame contains any display information or not.

5. The method of claim 4, wherein said subpicture frame is received in RLE (run length encoded) format, and wherein said line information is generated by examining the lengths of the codes in the RLE format.

6. The method of claim 4, wherein said generating comprises:
    examining each of the pixel values forming said subpicture frame; and
    counting a number of pixels values in each row having display information, wherein the entry in said array for the row is set to equal to the corresponding number.

7. The method of claim 1, further comprising:
    identifying a set of lines in each of said sequence of combined images, wherein each line is indicated to contain display information by said line information; and
    filtering said set of lines to remove sharp transitions at the boundary of an area of said subpicture frame containing display information.

8. A system for generating images for display, said system comprising:
    a first block to generate a line information for a subpicture frame, said line information indicating the specific lines of said subpicture frame containing display information;
    a memory to store said subpicture frame;
    a second block to provide a sequence of image frames; and
    a display image output block to form a sequence of combined frames, wherein each combined frame is formed by combining a corresponding one of said sequence of image frames with said subpicture frame, said display image output block retrieving only those lines of said subpicture frame from said memory, which are indicated to contain display information by said line information.

9. The system of claim 8, wherein said sequence of image frames and said subpicture frame are part of a same multimedia signal and said system comprises a multimedia device.

10. The system of claim 8, wherein said first block is operable to:
    examine each of the pixel values forming said subpicture frame;
    count a number of pixel values in each row of said subpicture frame having display information; and
    storing the number for each row in a corresponding element of an array such that said array stores said line information.

11. The system of claim 8, further comprising a line alpha buffer to store said line information, wherein said display image output block retrieves said line information from said line alpha buffer while generating each of said sequence of combined frames.

12. The system of claim 8, wherein said display image output block is operable to:
    identify a set of lines in each of said sequence of combined images, wherein each line is indicated to contain display information by said line information; and
    filter said set of lines to remove sharp horizontal lines/transitions at the boundary of an area of said subpicture frame containing display information, wherein the filtered combined images are displayed on a interlaced display screen.

* * * * *